No. 873,149. PATENTED DEC. 10, 1907.
J. H. BLAKE.
DUMPING CAR.
APPLICATION FILED SEPT. 10, 1907.

Witnesses Inventor
By John H. Blake
Mauro, Cameron, Lewis & Massie
Attorneys

UNITED STATES PATENT OFFICE.

JOHN H. BLAKE, OF KNOXVILLE, TENNESSEE.

DUMPING-CAR.

No. 873,149.  Specification of Letters Patent.  Patented Dec. 10, 1907.

Application filed September 10, 1907. Serial No. 392,178.

*To all whom it may concern:*

Be it known that I, JOHN H. BLAKE, of Knoxville, Tennessee, have invented a new and useful Improvement in Dumping-Cars, which invention is fully set forth in the following specification.

The present invention relates to dump cars and similar structures having walls or sides arranged to be automatically displaced when the car is tilted to discharge the load; and the object of the invention is to provide improved mechanism for effecting the displacement of the walls or side boards by automatically moving the lower edges thereof outward as soon as the car begins to dump. This movement of the side boards avoids the friction due to the continued contact of the load therewith, and swings said boards when raised into a position approaching or reaching parallelism with the bottom of the car body, to the end that there may be provided a larger space through which the load is discharged.

An additional feature of the invention resides in the provision of a removable connection between part of the mechanism for actuating the side boards, and the truck, to the end that the car body and all of the mechanism for actuating the movable walls or side boards may be readily removed from the truck.

Figure 1:
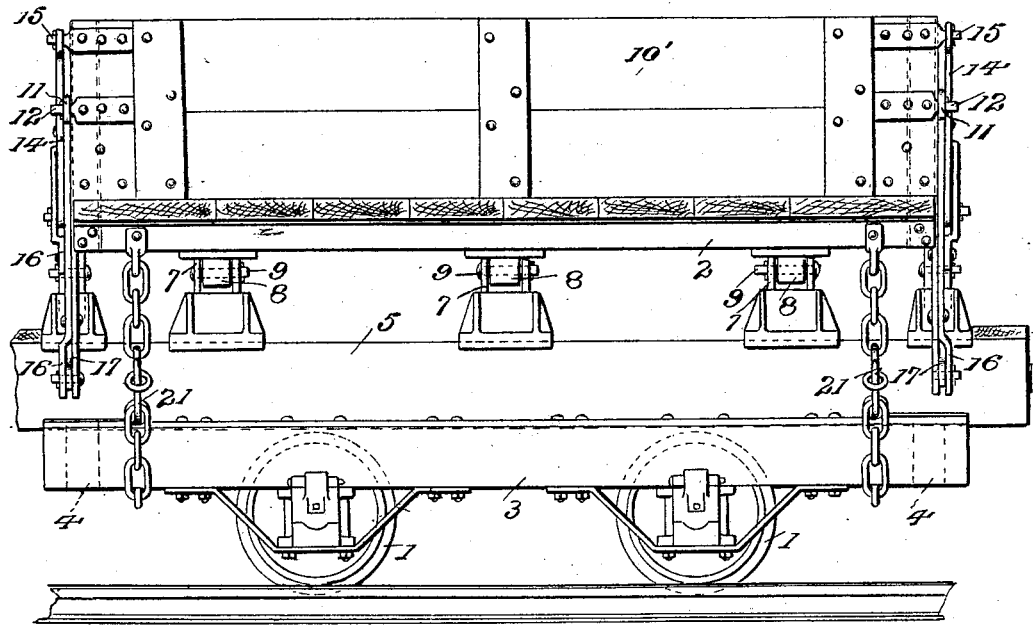
Figure 2:
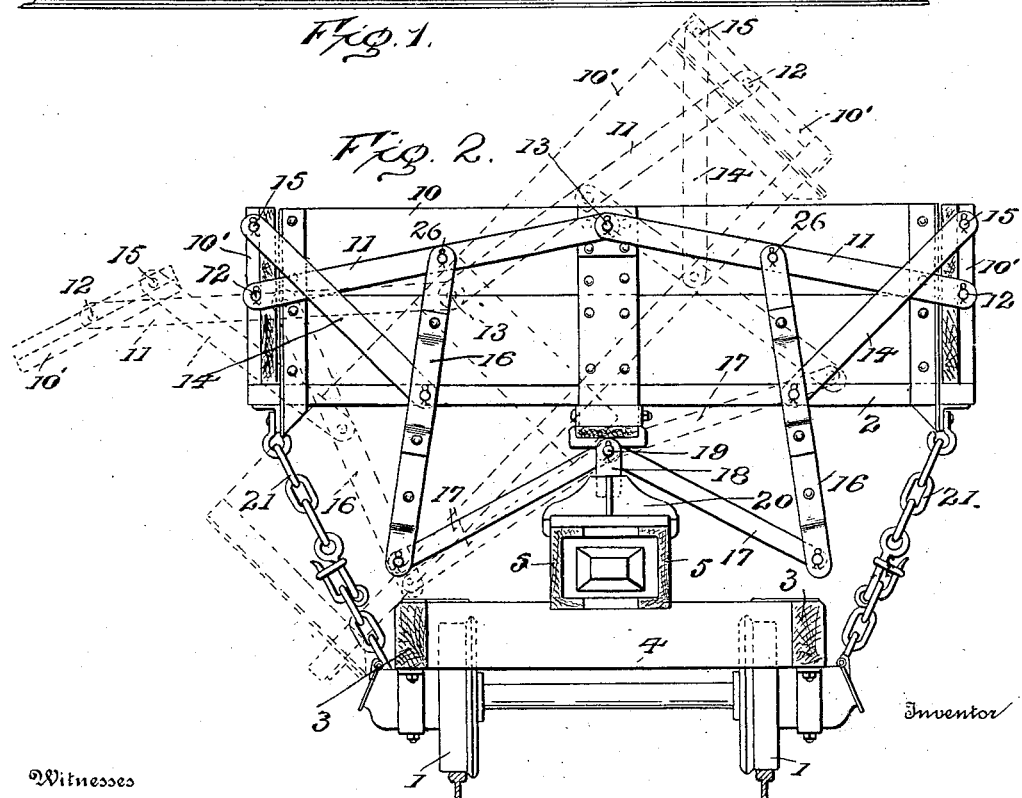

The invention will be better understood by reference to the accompanying drawings, wherein Figure 1 is a side elevational view of the car shown in Fig. 2; and Fig. 2 is an end view of a dump car provided with the improved mechanism, the position of the car and associated mechanism when the car body is tilted being shown in dotted lines.

Referring to the drawings, 1 indicates the wheels of a truck which supports the car body 2, said truck being provided with longitudinal side beams 3 and end beams 4. Extending centrally and longitudinally of the truck and mounted on end beams 4 are the center sills 5 to each end of which is secured the usual draw-bar. Arranged on these center sills and spaced at suitable intervals is a plurality of jaws 7 which receive lugs 8 secured to the center of the under side of the car body, pivot pins 9 passing through said jaws and lugs in such manner as to permit the car body to swing or tilt toward either side of the truck about said pivots, until the bottom of the car body contacts with and rests upon side beams 3, as shown in dotted lines in Fig. 2.

The car body is provided with stationary, fixed walls or ends 10 and movable walls or side boards 10', the latter extending from end to end of the car bed with just enough clearance therebetween and the ends 10 to permit of free operation. As the mechanism associated with the several displaceable walls is the same and identical at each end of the car, that associated with only one displaceable wall or side board need be described.

Each movable wall is connected to each fixed wall 10 by links 11, said links being pivoted to the ends of the movable wall or side board at any suitable point, herein illustrated as at a point 12 about the middle thereof, and also pivoted to said fixed walls 10 at any suitable point, preferably at a central point 13. In order to maintain each of the side boards 10' in a proper vertical position when the car body is righted and ready for loading, and also to force the lower edges of the side boards outward from the car body as soon as the car body is tilted to discharge its load, a second link 14 is provided, said link having one extremity pivoted to the end of the side board at any suitable point, here shown as at 15 near the top thereof. This link 14, which as herein illustrated is shorter than link 11, is arranged to cross the latter, and at its other end is pivoted to a toggle lever 16 which latter is in turn pivoted at one end to one extremity of its companion toggle lever 17. At its other end said lever 16 is pivoted to link 11 at a point 26 intermediate the extremities of the latter. Toggle-lever 17 has a flat plug 18 pivoted to its inner end by pin 19 which is arranged in line with pins 9, at the axis about which the car body swings, said finger removably engaging in a socket 20 mounted on sills 5.

The operation of the device is as follows: When the car body is tilted to discharge the load, the knuckle or joint of toggle levers 16 and 17 comes into contact with and rests upon side beams 3, and as the car bed continues to tilt, toggle lever 16 is moved into the dotted line position shown in Fig. 2 with its upper end projecting beyond the end walls of the car, and link 11 secured thereto is projected laterally over the car in substantially a horizontal line, thereby removing the attached side board from its position on the car body and maintaining it in a raised or elevated position relatively thereto. It will be observed that link 11, when the car body is in its normal or righted position is downwardly inclined from pivot point 13, and accordingly this insures that the side board is immediately separated laterally from the car body as soon as the tilting of the car commences.

As has been heretofore stated, the lower edge of the movable wall or side board which is to be raised begins to swing outwardly at the moment the side board begins to separate from the car body when the latter is tilted, in order to facilitate the raising of said side board and to enlarge the space through which the load is to be discharged. In this connection it will be observed from an inspection of Fig. 1 that the angle formed by the outer end of link 11 and lever 16 is much smaller when the car body is righted and the side boards in place than when the car body is tilted. In view, therefore, of the fact that link 14 is fixedly pivoted at one end to toggle lever 16 and at its other end to a point near the top of the side board, as the angle referred to increases, link 14 which crosses link 11 will have to span a continuously increasing angle, and accordingly the top of the side board will be pulled down around 12 as a pivot while the lower edge thereof is forced outwardly, until said side board is practically parallel with the bottom of the car body. It will be appreciated that when the car is righted the link 11 and toggle lever 16 will again assume the position shown in full lines in Fig. 1, and link 14 will force the side board to again assume its vertical position relatively to the bottom of the car body. Should it become desirable at any time to remove the car body from the truck, this can be readily effected by disconnecting chains 21, removing plugs 18 from sockets 20 and separating jaws 7 from lugs 8 by removing pivot pins 9.

It will be appreciated that the construction illustrated in the drawings and described in the foregoing specification is but one expression of the inventive idea, that the structure illustrated may be varied or modified without departing from the principle of the invention, and that the invention may be used in connection with apparatus analogous to dump cars.

What is claimed is:

1. In a dump car or similar structure, the combination of a body having a movable wall, a lever, and a pair of crossed links connected to said movable wall and to said lever.

2. In a dump car or similar structure, the combination of a body having a movable wall, a pair of toggle levers, and a pair of crossed links each pivoted at one end to said movable wall and also pivoted to one of said toggle levers.

3. In a dump car or similar structure, the combination of a body having a movable wall, a lever, a pair of crossed links each pivoted to said movable wall and to said lever, one of said links being shorter than the other.

4. In a dump car or similar structure, the combination of a body having a movable and a fixed wall, a pair of toggle levers, a link pivoted at its ends to said movable wall and fixed wall respectively and connected at an intermediate point to one of said toggle levers, and a second link crossing said first-mentioned link and pivoted at its ends to said movable wall and toggle lever respectively.

5. In a dump car or similar structure, the combination of a body having a movable and a fixed wall, a link pivoted at one end to said movable wall and at its other end to said fixed wall, a lever pivoted to said link and adapted to hold it and the movable wall in an elevated position when the car dumps, and a second link crossing said first-named link and pivoted to the movable wall and lever respectively and adapted upon dumping of the car to turn said movable wall on its pivotal connection with the first link and thereby move said wall outward at its lower edge and inward at its upper edge.

6. In a dump car, the combination of a truck, a car body having a movable wall, a pair of toggle levers for actuating said movable wall, a plug removably fitting a socket on said truck, and a pivot pin connecting one of said levers at one end with the plug.

In testimony whereof I have signed this specification in the presence of two subscribing witnesses.

JNO. H. BLAKE.

Witnesses:
 I. A. MARTIN,
 S. L. RUTHERFORD.